US012704853B2

(12) United States Patent
Chattopadhyay et al.

(10) Patent No.: US 12,704,853 B2
(45) Date of Patent: Aug. 11, 2026

(54) REAL-TIME VALIDATION OF ROBOTIC SENSING SYSTEMS

(71) Applicant: Intel Corporation, Santa Clara, CA (US)

(72) Inventors: Rita Chattopadhyay, Chandler, AZ (US); Cornelius Buerkle, Karlsruhe (DE); Fabian Oboril, Karlsruhe (DE); Rafael De La Guardia Gonzalez, Vizcaya (ES); Kay-Ulrich Scholl, Malsch (DE); David Israel Gonzalez Aguirre, Portland, OR (US); Atul Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 18/619,202

(22) Filed: Mar. 28, 2024

(65) Prior Publication Data

US 2025/0306596 A1 Oct. 2, 2025

(51) Int. Cl.

| | |
|---|---|
| ***G06F 40/00*** | (2020.01) |
| ***B25J 13/00*** | (2006.01) |
| ***B25J 19/02*** | (2006.01) |
| ***G05D 1/617*** | (2024.01) |
| ***G06V 20/00*** | (2022.01) |
| *G05D 105/80* | (2024.01) |

(52) U.S. Cl.
CPC ............ *G05D 1/617* (2024.01); *B25J 13/003* (2013.01); *B25J 19/021* (2013.01); *G05D 2105/80* (2024.01)

(58) Field of Classification Search
CPC ... G05D 1/617; G05D 2105/80; B25J 13/003; B25J 19/021
USPC ............................................................ 701/23
See application file for complete search history.

(56) References Cited

U.S. PATENT DOCUMENTS

| | | | |
|---|---|---|---|
| 8,447,863 B1 | 5/2013 | Francis, Jr. et al. | |
| 9,403,279 B2 * | 8/2016 | Smith | B25J 13/003 |
| 11,195,041 B2 | 12/2021 | Konolige et al. | |
| 2021/0402593 A1 * | 12/2021 | Wake | G06V 40/28 |

(Continued)

FOREIGN PATENT DOCUMENTS

WO WO-2024110171 A1 * 5/2024 ............... B25G 1/00

OTHER PUBLICATIONS

"What is NPL Natural Language Processing) and its components?," Oct. 31, 2023, Call Criteria, whole document. (Year: 2023).*

(Continued)

*Primary Examiner* — Tiffany P Young
(74) *Attorney, Agent, or Firm* — Viering, Jentschura & Partner mbB

(57) ABSTRACT

Disclosed herein are systems, devices, and apparatuses for improved perception/sensing systems in robots or other vehicles. The system receives sensor data representative of a field of view of a robot and determines, based on the sensor data and an object detection model, an identification of an object within the field of view and an accuracy metric of the identification of the object, wherein the object detection model relates the sensor data to the identification. The system also requests, based on the accuracy metric, an informational feedback from the identification of the object and updates the object detection model to an updated object detection model based on the informational feedback.

14 Claims, 9 Drawing Sheets

(56) References Cited

U.S. PATENT DOCUMENTS

| | | | | |
|---|---|---|---|---|
| 2023/0271330 | A1* | 8/2023 | Sundaralingam | B25J 9/163 700/246 |
| 2024/0256794 | A1* | 8/2024 | Gildert | B25J 11/0005 |

OTHER PUBLICATIONS

English translation of WO2024110171 (Year: 2024).*

Huihan Liu, Alice Chen, Yuke Zhu, Adith Swaminathan, Andrey Kolobov, Ching-An Cheng, "Interactive Robot Learning from Verbal Correction," Oct. 26, 2023, whole article. (Year: 2023).*

European Search Report issued for the corresponding European patent application No. 25150053.4, dated Jun. 20, 2025, 4 pages (for informational purposes only).

* cited by examiner

REAL-TIME VALIDATION OF ROBOTIC SENSING SYSTEMS

TECHNICAL FIELD

The disclosure relates generally to validation of robotic sensing systems, and in particular, real-time interfaces for inquiring, validating, and/or improving object detection, environmental mapping, and data collection of sensing systems on robots.

BACKGROUND

It is common for robots, vehicles, and other moving objects to employ sensing systems that gather information about their surrounding environment, analyze the gathered information to make determinations about the environment, and then make safety, navigation, and/or other control decisions based on the determinations about the environment gleaned from sensor information. As well-designed as todays sensing systems may be, they may not accurately detect, classify, and analyze all objects that may be located in the robot's environment, especially in real-life scenarios, where there may be significant challenges related to lighting, occlusion, view angle, perspective, change in size/shape of objects, etc. Consumers are not able to evaluate the accuracy, capability, and confidence of the sensing system of a robot which may have been deployed in the customer's environment. Given how critical object detection and classification may be for collision avoidance, navigation, safety, route planning, autonomous driving, task implementation, and other activities, it may be important for sensing systems to improve their detection and classification of objects in the environment.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
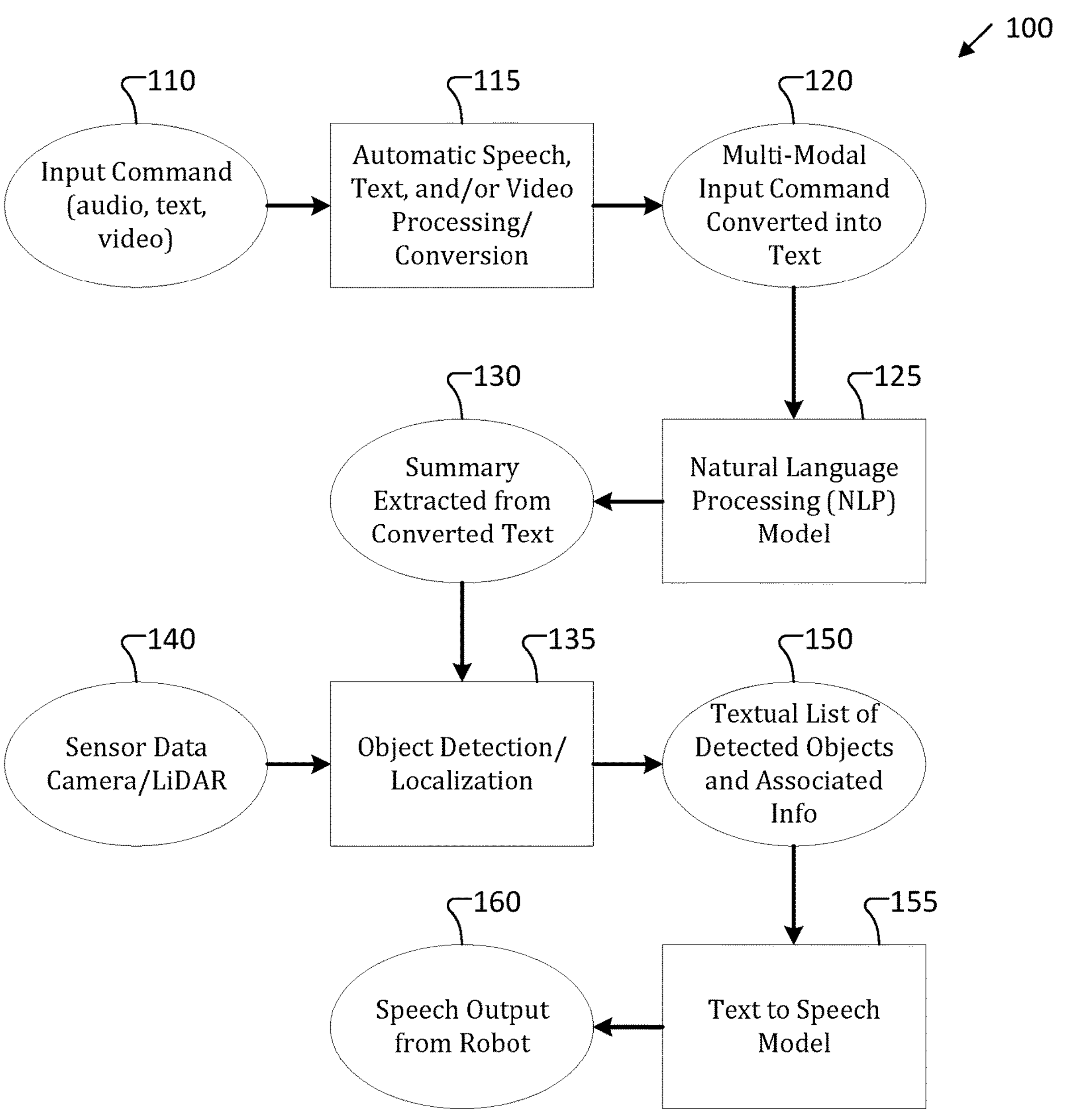
FIG. 1 shows an example flow diagram showing how the disclosed sensing system may interact with a nearby human.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of machinery that may be operated by software, including autonomous, partially autonomous, stationary, moving, or other objects or entities that utilize software as part of their operation. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a robot, a personal transporter, a boat, a ship, a submersible, a submarine, a drone, an aircraft, industrial machinery, autonomous or partially autonomous machinery, or a rocket, among others.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. More generally, "vehicle" and "robot" may be used herein to refer to devices that utilize sensor information about the environment to inform operation of the vehicle/robot with respect to the environment.

Given that vehicles may rely on sensor information for critical operations such as collision avoidance, navigation, safety, route planning, autonomous driving, task implementation, and other activities, the accuracy of the sensing systems is paramount to safe operation in the environment. While the expectation may be that today's robots have sensing systems that can "see" objects with the same level of accuracy as a human, there still may be situations that pose challenges to the sensor system, impacting object detection and any of the operations that rely on sensor information. In today's systems, consumers are not able to evaluate the accuracy, capability, and confidence of the sensing system of the robot. Likewise, robots are unable to improve their sensing systems with real-time input from humans.

The sensing systems disclosed in further detail below provides an interface for easy, repeatable, non-intrusive, real-time, and/or quick way for a robot to improve its detection/analysis systems with input from a nearby human and/or for a human to inquire about the accuracy, capability, and/or confidence of the current state of the robot's sensing system. The sensing system interface may provide a way for a human user to learn about the field of view of the robot's sensor system, its object detection accuracy, its confidence levels, its learning model, etc. The sensing system interface may also provide a way for the robot to communicate with a nearby human or other device to verify, adapt, and improve the model it uses in its sensing system, and thereby, incrementally adapt to new, different, unexpected, etc. deployment settings. The sensing system interface may also be used to update the map or a representation of the operational environment of the robot (e.g. occupancy grid) that may be maintained by the robot or on an edge-based or cloud-based server. By using text-to-speech and voice-to-text for communications between the robot and the human, the disclosed sensing system may also provide an interface between robot and human that does not require the use of a display or a physical input device (e.g., keyboard, mouse, touchscreen, etc.). This also may allow a non-technician (e.g., an untrained operator) to communicate with the robot, providing transparent, interactive, and adaptive access to the models used by the sensing system for detecting information about the environment.

FIG. 1 is an example flow diagram 100 showing how the disclosed sensing system may interact with a nearby human/robot. The sensing system may provide an audio interface to the object detection model of a robot/vehicle, that the human may use to verify the detection accuracy and the confidence level of the sensing model of the robot. In this manner, the human may assess whether the robot's sensing system may sufficiently provide safe, reliable, and/or satisfactory operation in the deployment environment. The human may provide, in 110, an input command with respect to the robot's sensing system. While it is envisioned that the input command will be a voice-based command, other input methods such as text, an audio file, or a video file, may be used to communicate command to the robot. The commands may be in plain language, such as, "Tell me what you see in front of you and how well," with the expectation that the robot will reply with the name of the objects it has been able to identify and the confidence level in its object detection based on its pre-trained models.

To process the command, the sensing system may, in 115, convert the command into text using a speech processing model, an audio processing model, a text processing model, a video processing model, etc. The result of the conversion may be, as shown in 120, a multi-modal input command that has been converted into text. The converted text may then be processed, in 125, by a natural language processing ("NLP") model that may summarize the text into a processable command 130 that may be provided to an object detection/localization model 135 that also uses sensor data 140 as an input, such as camera data, light detection and ranging (LiDAR) sensor data, and/or other sensor data for detecting and analyzing objects. The object detection/localization model 135 may output, for example, a textual list of detected objects 150 and associated information that may include, for example, confidence levels, labels of objects, bounding boxes, coordinates with respect to the real world environment, trajectory predictions, estimated movement parameters, etc. This information may then be input into a text to speech model 155 that converts the list of detected object and associated information into a speech output 160 or other type of output that may be played audibly, or visually to provide a response to the user's command.

As should be understood, the sensing system may be configured to respond to any type of command. Some additional examples include a request to simply identify objects within the robot's field of view, a request to provide the coordinates of each object and the confidence level with which it was detected, a request to categorize each object (e.g., a label identifying the type of object) and the confidence level with which its categorization was determined, a request to identify the objects at the extremes of the field of view (e.g., objects at the edges of the top, bottom, left, and right of the field of view), etc.

Figure 2:
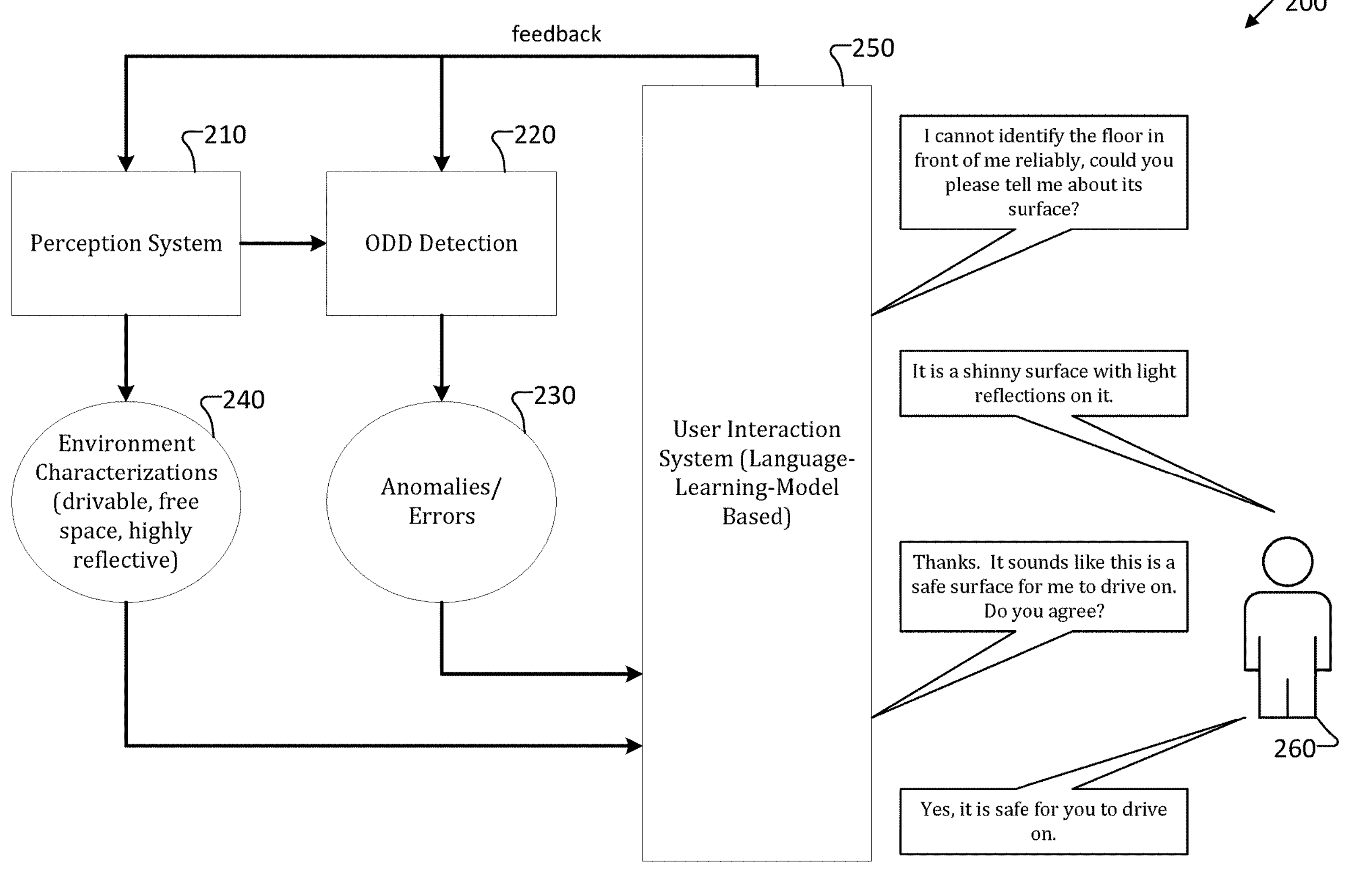
FIG. 2 illustrates an example flow diagram showing how the disclosed sensing system may be able to automatically request help (e.g., from nearby humans, robots, etc.) in diagnosing anomalies, errors, a lack of confidence in its detection and labeling model, etc.

FIG. 2 shows example flow diagram 200 showing how the disclosed sensing system may be able to automatically request help (e.g., from nearby humans, robots, etc.) in diagnosing anomalies, errors, a lack of confidence in its detection and labeling model, etc. Such a diagnosis tool may be helpful in deploying detection systems (e.g., artificial-intelligence-based detection systems) because it may be used to help improve situations that the robot may experience that are outside of the expected environment or what the robot is familiar with. For example, a robot may be trained to detect certain types of objects, environments, traffic situations, roads, etc. However, if the robot experiences an object, environment, traffic situation, road, etc. that it has no familiarity with or that it is uncertain about (e.g., an out of distribution event), the robot may utilize the disclosed sensing system to verbally request details from a nearby human (or other robot with better sensing capabilities) about the anomaly causing the out of domain event. If the robot determines that its sensor data for the current situation is too far away from the training data or satisfies a predefined criterion (such as an object detection having too low of a confidence level, a set of rules that cannot be sufficiently satisfied in the current situation, etc.), the robot may activate diagnostic/investigative tools of the sensing system to learn how to deal with the anomaly.

For example, if the robot's perception system was never trained to detect water puddles, a water puddle in the robot's environment may cause an out of distribution ("OOD") event, and the robot may then discuss the anomaly with a nearby human/robot (e.g. the owner of the robot, co-workers in a warehouse where the robot is operating, or other robots that have already been trained on water puddles), stopping its operation to have a dialogue/exchange with the nearby (and authorized) person or robot in its vicinity. To communicate the issue, the robot may translate the technical information about the anomaly into a human-understandable text/speech and illicit responses from the nearby human/robot. As should be understood, this may be an interactive and iterative process, where the responses received from the human/robot may be analyzed and if more information is needed, further information/questions may be posed until the robot is aware of how it should deal with the anomaly.

For example, in a situation where the robot detects an anomaly such as where an unidentified object has appeared in the field of view of the robot's front camera. The robot may generate verbal statements/questions based on this anomaly, such as: "I see an object in my front camera at about 2 meters away, but I am unable to identify it. Could you please tell me what kind of object it is?" The nearby human could then respond with additional information about the unknown object. As should be understood, the conversation may involve multiple requests to ensure the robot obtains the information it is seeking. For example, if the human response what wrong or insufficient, the robot could continue the conversation. For example, if the human response is clearly incorrect, like describing the wrong object, the robot may say: "No. Not that object, the one directly next to the one you mentioned." It may also be possible that the robot requests the helping person to point to certain objects, touch the object, move the object, shine a laser pointer/light pointer on the object, etc., to be sure the robot and human are communicating about the same object.

An example of this type of flow is shown in FIG. 2, where the robot's perception system 210 may analyze the environment and determine that something in the field of view is causing an ODD event that is registered as an ODD detection 220. The anomalous event/errors 230 from the ODD detection 220 and the current characterizations 240 from perception system 210 are provided to a user interaction system 250 that may generate text/speech related to the anomalous event/errors 230 to engage a nearby human 260 in a conversation to obtain information about the ODD event. The information obtained from the nearby human 260 is then provided as feedback to the perception system 210 and ODD detection 220 that the robot may use to train its perception system. As one example, assume that the perception system 210 initially cannot reliably identify the state of the floor in front of it or the robot has determined that it cannot move because it is surrounded by objects on all sides. The user interaction system may start a conversation with the nearby human 260 by stating: "I cannot reliably identify the floor in front of me. Could you please tell me about the floor surface in front of me?" The human 260 may be respond by explaining that "This is a glossy surface with a lot of reflections." The robot may then ask the human "Is it safe to drive forward, or is there an object in my way?" The human may then respond, "Yes, it is safe. There are no objects in front of you or behind you. The spots on the floor are just light reflections."

As should be understood, this interaction is merely exemplary, and the user interaction system 250 may utilize any type of conversation model (e.g. a language learning model) to request and analyze information from the nearby human until it has sufficiently addressed the anomaly so that it can provide feedback to the perception system 210 and ODD detection 220 so that the initially detected anomaly no longer registers as an ODD event.

transfer information digitally (e.g., via a wireless communication interface to exchange information).

The disclosed sensing system may support a variety of scenarios for interacting with humans and other robots, including those already discussed above. The table of scenarios below provides a non-exhaustive list of use cases, commands, prompt examples, data inputs, and corresponding actions that may be support by the sensing system.

| Use Case | Command Input or Output to Robot | Verbal Prompt Example | Data Input | Action(s) |
|---|---|---|---|---|
| Detection accuracy verification of objects in field of view ("FoV") | Input: Audio Command | "Tell me all you see" | Camera/Sensor Data | Audio from robot: List of objects, locations, and confidence levels |
| Specific object detection verification | Input: Audio + Pointing to the object in the FoV (e.g., laser pointer) | "Tell me about this object" (identified by pointing to the object) | Camera/Sensor Data | Audio from robot: Name of the pointed object, label, location, confidence level, etc. |
| Detected objects logging information from timestamp 1 to timestamp 2 for postmortem investigation | Input: Audio command | "Tell me objects detected from timestamp xxxx to timestamp yyyy" | Stored object lists from different time frames. | Audio from robot: List of objects, confidence levels, and their timestamp/frame no. |
| Incremental learning | Output: Robot requests labels of objects it detected with very low confidence | Robot audio output: "Tell me the name of object at x, y, z location." | Audio input: Human or nearby robot provides the name of the object at the x, y, z location. | Robot updates its training dataset to include the name of the object to expand its detectable object classes. |

Figure 3:
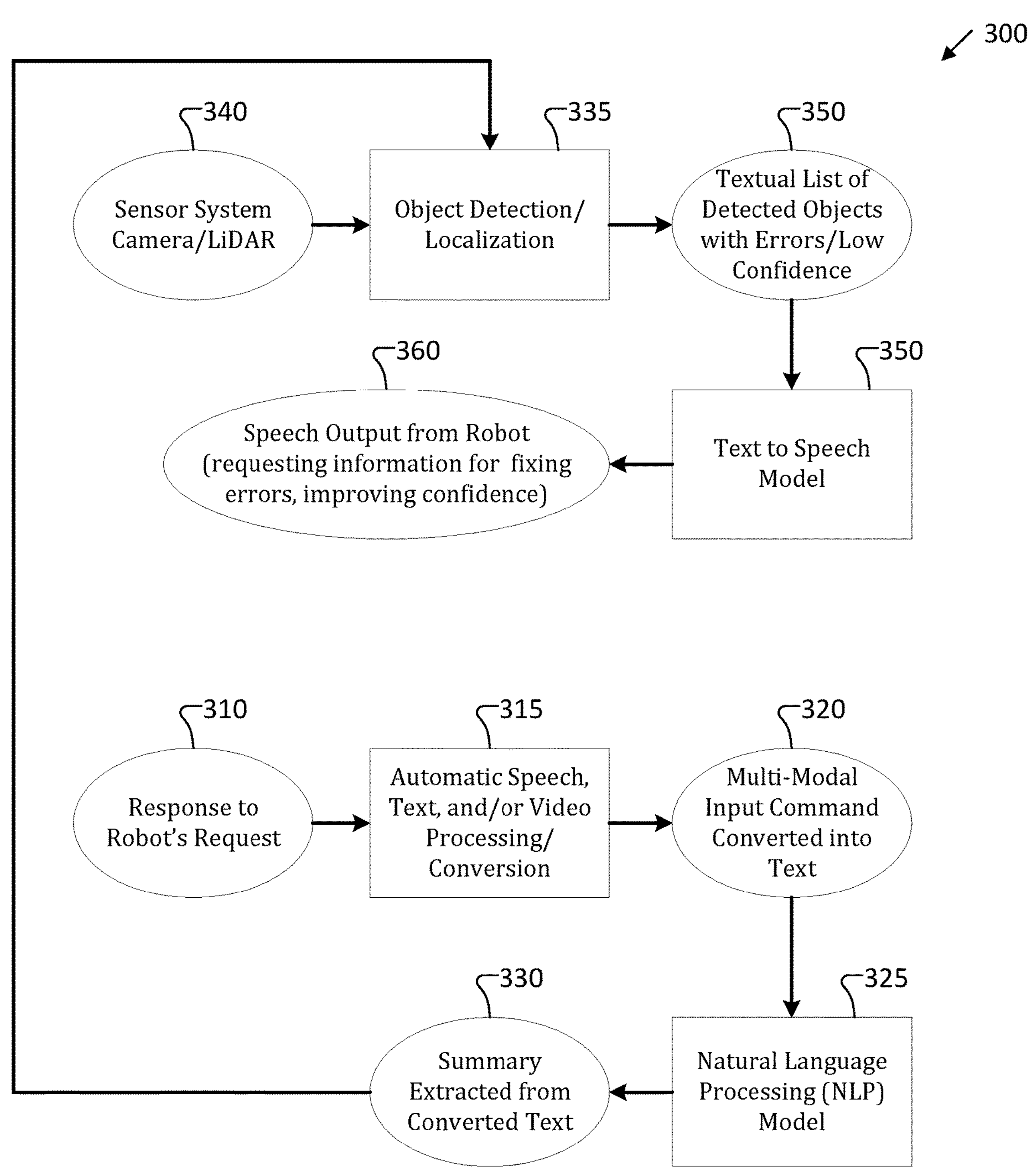
FIG. 3 depicts an example flow diagram of how the disclosed sensing system may interact with a nearby human to obtain information when diagnosing an unfamiliar situation (anomalies, errors, lack of confidence, etc.)
Figure 4:
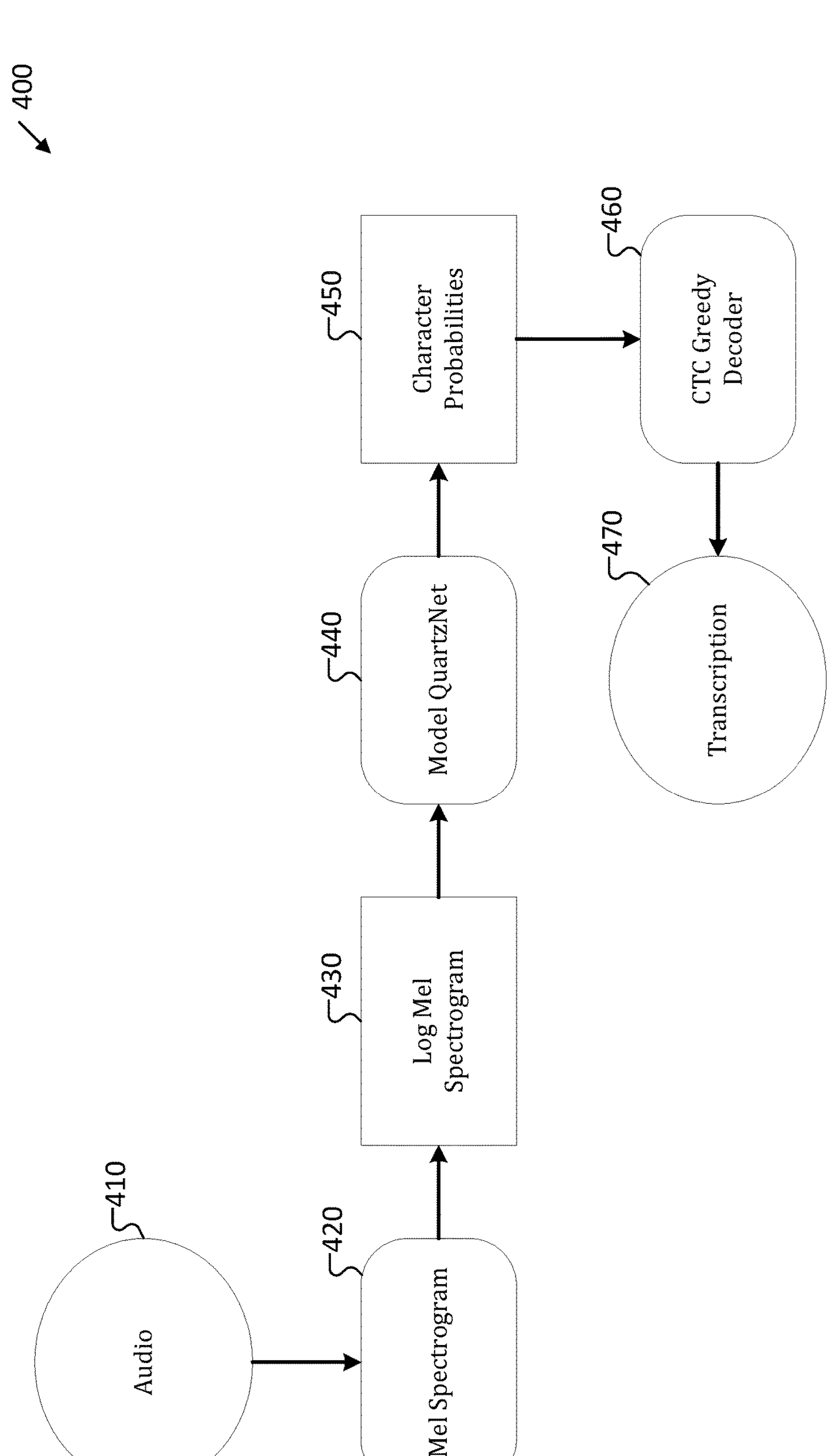
FIG. 4 shows additional details of an example automatic speech processing pipeline that may be used by the disclosed sensing system for converting audio into text.

FIG. 3 is an example flow diagram showing how the disclosed sensing system may interact with a nearby human to obtain information about an ODD event. The sensor system 340 (e.g., camera, LiDAR, and/or other sensor data etc.) may provide sensor data to an object detection/localization model 335 that generates a list of detected objects and label them. In the example of FIG. 3, the object detection/localization model 335 fails to recognize/label certain objects with sufficient accuracy and thus registers an ODD event and generates, in 350, a textual list of the objects that cannot be identified, have a low confidence, etc. The robot then generates a prompt for asking a nearby human or other robot to identify and label objects in the vicinity of the mis-detected or mislabeled objects. This prompt may be converted from text to speech using a text to speech model 355, and then the speech is output, in 360, via an audio device for interacting with the human. The nearby human may, in 310, verbally respond to the robot's prompts and process them through an automatic speech/image/text processing model 315 to convert the multi-model commands into text, at 320, that can be processed by a natural language processing model 325 to summarize the human's response into training information that the robot may use, in 330, to update its object detection/localization model 335 with the identified objects/labels. As noted earlier, in addition to a nearby human, the robot may also interact with a nearby robot that may have a more advanced or better-trained object detection/localization model. In this case, the robots may either converse with one another (e.g., audibly, as if the robot is conversing with a human) or they may simply FIG. 4 shows additional details of an example automatic speech processing pipeline 400 that may be used by the sensing systems discussed above to convert audio into text (e.g., the conversion in 115 of FIG. 1 or in 315 of FIG. 3). For example, an audio signal 410 may be converted into a Mel Spectrogram 420. The Mel Spectrogram 420 may be a representation of the frequency content of an audio signal over time, using a scale based on the human perception of sound. The Mel Spectrogram 420 may be derived from a Short-Time Fourier Transform (STFT) of the audio signal 410, which computes the frequency content of small, overlapping segments of the signal over time. The Mel Spectrogram 420 may be converted into a Logarithm 430 of the Mel Spectrogram 420. The Logarithm 430 may be provided to an end-to-end automatic speech recognition such as a QuartzNet model 440 that outputs character probabilities 450 representing the model's confidence that each output character is the correct transcription for a given segment of the audio signal 410. A Connectionist Temporal Classification (CTC) greedy decoder 460 may then convert the output character probabilities 450 into a final text transcription 470 of the audio signal 410. As should be understood, this is just one example of an audio to text processing model, and other automatic speech processing pipelines may be used.

Figure 5:
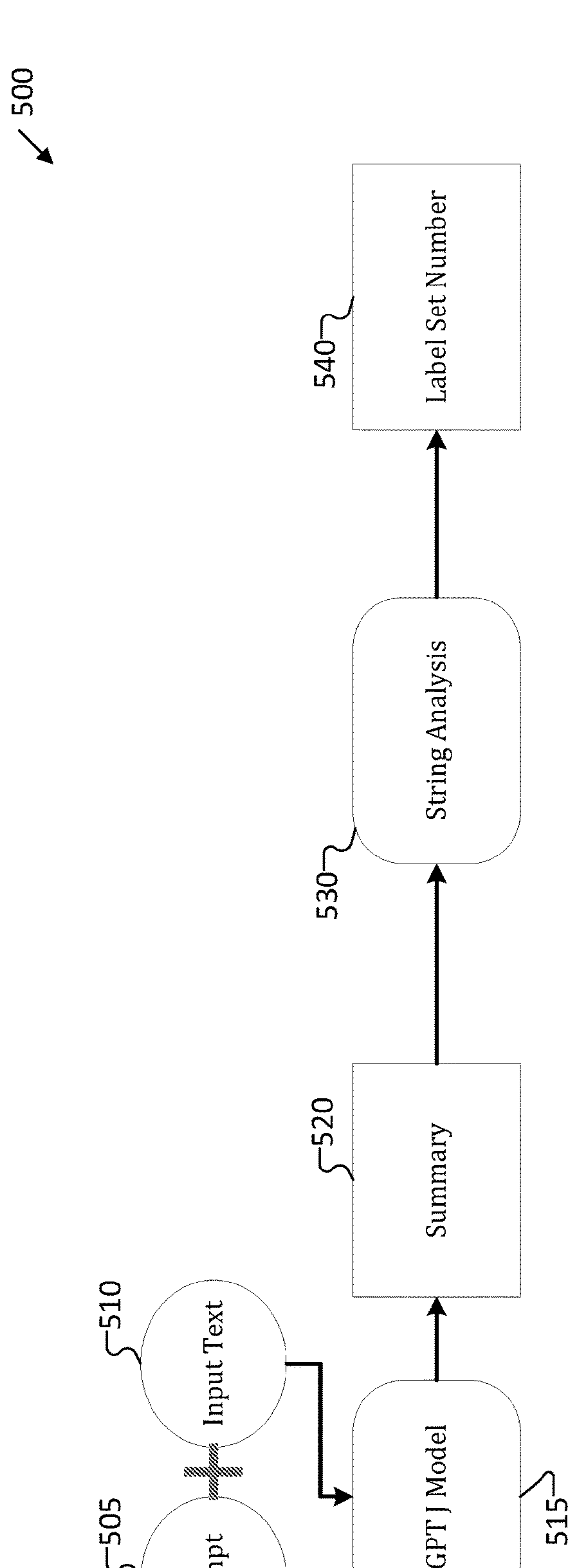
FIG. 5 shows additional details of an example natural language processing system that may be used by the disclosed sensing system for extracting a summary of the transcribed text.

FIG. 5 shows additional details of an example natural language processing system 500 that may extract a summary of the transcribed text in the sensing systems discussed above (e.g., NLP model 125 of FIG. 1 or NLP model 325). Input text 510 of the audio (e.g., the final text transcription 470 of FIG. 4) and a prompt 505 are input into a generative pre-trained transformer model ("GPT model") 515 to generate a human-like summary text 520 based on the input text 510 and the prompt 505. As should be understood, the prompt 505 may be part of the input text 510 or may be additional instructions given to influence the GPT model 515, operating as a guiding question for the model to generate text that aligns with the prompt 505. The GPT model 515 may use its pre-trained knowledge and the context provided by the input text 510 and the prompt 505 to generate a summary text 520 that is coherent and relevant. The summary text 520 may also be provided to a string analysis module 530 that provides a numbered set of strings and a corresponding label 540.

Figure 6:
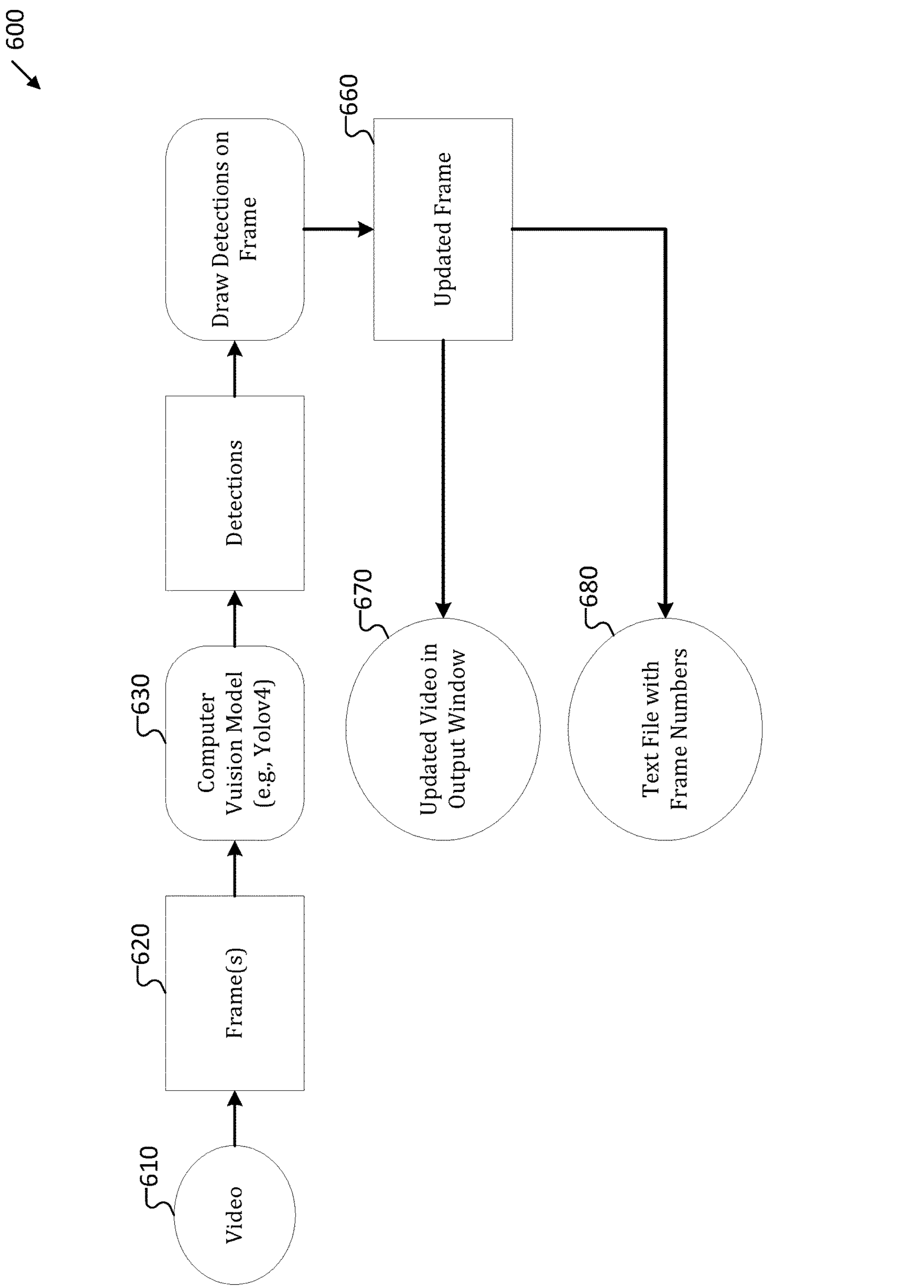
FIG. 6 shows additional details of an example object detection pipeline that may be used by the disclosed sensing system to process sensor input and to output a textual list of detected objects.

FIG. 6 shows additional details of an example object detection pipeline 600 that may be used by the sensing systems discussed above (e.g., object detection/localization 135 of FIG. 1 or 335 of FIG. 3) to process sensor input (such as a camera image or video image such as sensor data 140 of FIG. 1 or 340 of FIG. 3) to output a textual list of detected objects (e.g., 150 of FIG. 1 or 350 of FIG. 3). The sensor input or video 610 may be formed into individual frame(s) 620 that are process by a computer vision model 630 (e.g., Yolov4) that can detect objects and draw bounding boxes/labels on the objects in the frame. The updated frame 660 may then output a text file 680 with frame number, locations of detected objects within the frame, confidence metrics for the detection, and other detection information about the detected objects. The updated frame 660 may be also be used to output an updated video 670 that overlays the detection information over the original video 610. This updated video 670 may be, for example, output to an external display device that displays an augmented reality (AR) view of the environment (e.g., to an AR-HoloLens, for example, worn by the nearby human so that it may "see" what the robot is "seeing").

Figure 7:
FIG. 7 shows additional details of an example text to speech pipeline that may be used by the disclosed sensing system to generate speech from a text file.
Figure 7:
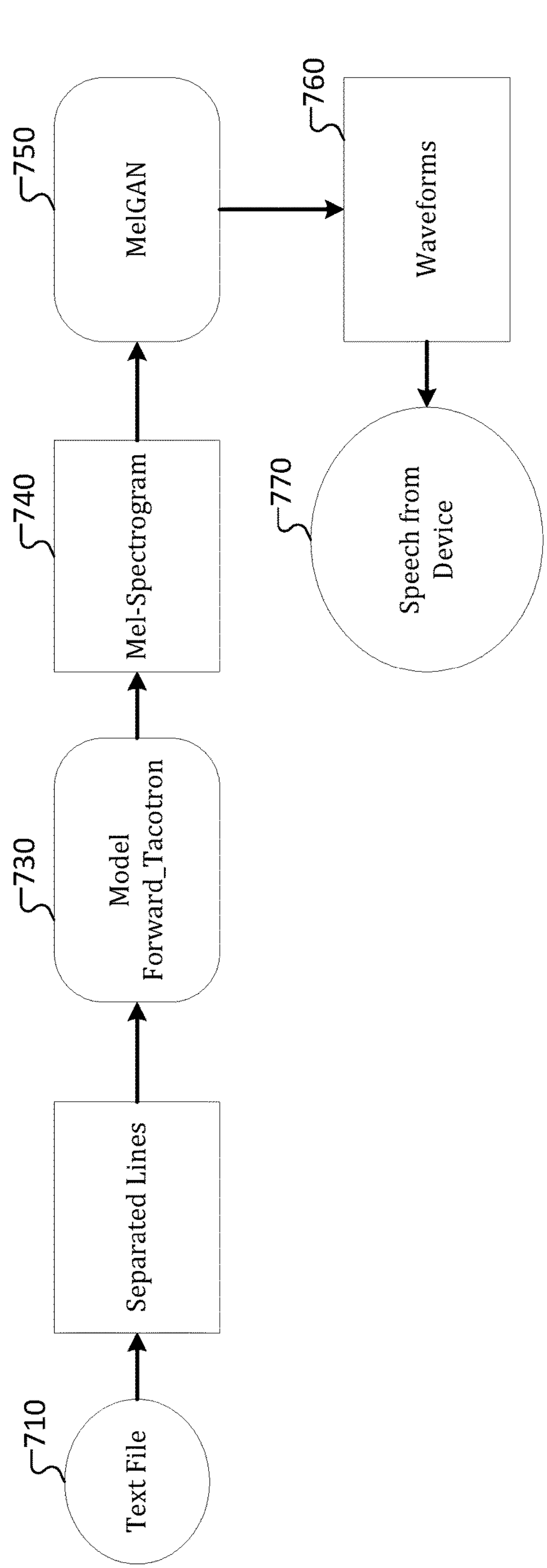

FIG. 7 shows additional details of an example text to speech pipeline 700 that may generate speech from a text file as discussed with respect to the sensing systems above (e.g., text to speech model 155 of FIG. 1 or text to speech model 355). A text file 710 (e.g., the textual list of detected objects 150 in FIG. 1 or 350 in FIG. 3) may be separated into separate lines of text and fed into a text-to-speech model 730 (e.g., a Tacotron model such as Forward Tacotron) that converts the separated lines of text file 710 into a Mel Spectrogram 740 (e.g., representations of the text-to-speech converted signals that capture information about the frequency content of the audio signal over time) that may be then processed by generative adversarial network-based model 750 (e.g. MelGAN) to generate speech waveforms 760 directly from the Mel Spectrogram 740. The speech waveforms 760 may then be played, in 770, audibly by the device (e.g., the robot) for communicating information to nearby humans.

Figure 8:
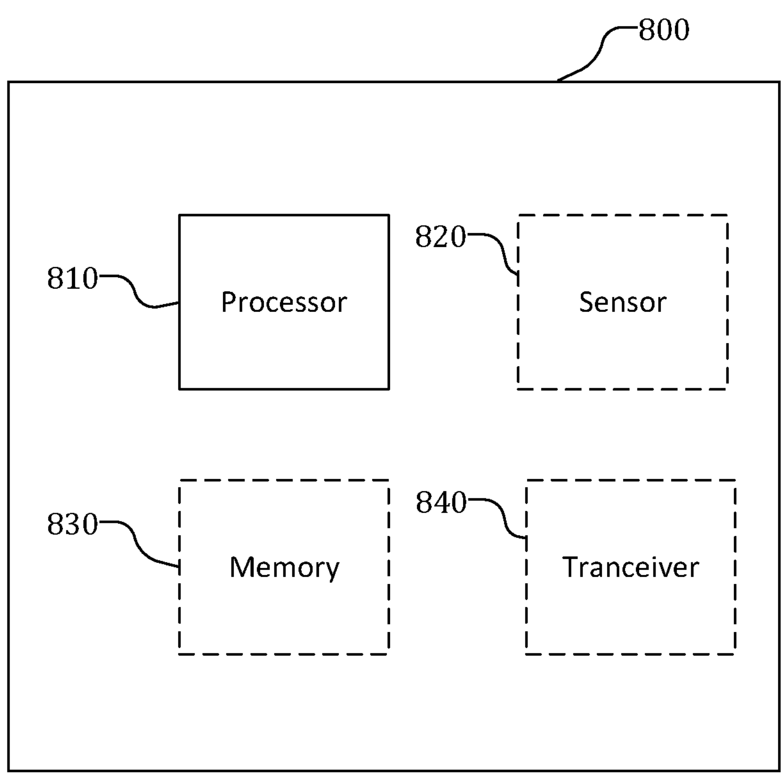
FIG. 8 illustrates an exemplary schematic drawing of a sensing system that may interact with a nearby human/robot.

FIG. 8 is a schematic drawing illustrating a device 800 for a perceptive sensing system of a robot. The device 800 may include any of the features discussed with respect to the sensing systems above and any of FIGS. 1-7. FIG. 8 may be implemented as a device, a system, a method, and/or a computer readable medium that, when executed, performs the features of the sensing systems described above. It should be understood that device 800 is only an example, and other configurations may be possible that include, for example, different components or additional components.

Device 800 includes a processor 810. Processor 810 of device 800 is configured to receive sensor data representative of a field of view of a robot. Processor 810 is also configured to determine, based on the sensor data and an object detection model, an identification of an object within the field of view of the robot and an accuracy metric of the identification of the object, wherein the object detection model relates the sensor data to the identification. Processor 810 is also configured to request, based on the accuracy metric, an informational feedback (e.g., verbal) from the identification of the object. Processor 810 is also configured to update the object detection model to an updated object detection model based on the informational feedback.

Furthermore, in addition to or in combination with any of the features described in this or the preceding paragraph with respect to device 800, processor 810 may be further configured to control movements of the robot based on the updated object detection model. Furthermore, in addition to or in combination with any of the features described in this or the preceding paragraph, processor 810 may be further configured to request the informational feedback based on whether the accuracy metric satisfies a predefined criterion. Furthermore, in addition to or in combination with any of the features described in this or the preceding paragraph, the predefined criterion may include whether the accuracy metric is below a threshold value of accuracy. Furthermore, in addition to or in combination with any of the features described in this or the preceding paragraph, the informational feedback may include a verbal feedback (e.g., from a human via an audio interface) and/or an electronic message (e.g., from another robot). Furthermore, in addition to or in combination with any of the features described in this or the preceding paragraph, the accuracy metric may include a confidence metric indicating an extent to which the identification of the object substantially correct.

Furthermore, in addition to or in combination with any of the features described in this or the preceding two paragraphs with respect to device 800, processor 810 may be further configured to maintain (e.g., in a memory 830) a representation of an operational environment of the robot (e.g., an occupancy grid), wherein the representation may include detected objects within the environment where the object is one of the detected objects, wherein processor 810 may be further configured to request, based on the accuracy metric, the informational feedback about the detected object. Furthermore, in addition to or in combination with any of the features described in this or the preceding two paragraphs, processor 810 may be further configured to update the representation of the operational environment to an updated representation based on the informational feedback about the detected object. Furthermore, in addition to or in combination with any of the features described in this or the preceding two paragraphs, processor 810 may be further configured to transmit the updated object detection model (e.g., wirelessly, e.g., via a transceiver 840) to an external server and/or another robot. Furthermore, in addition to or in combination with any of the features described in this or the preceding two paragraphs, processor 810 may be further configured to cause to transmit (e.g., via a transceiver 840) the updated representation to an external server and/or another robot Furthermore, in addition to or in combination with any of the features described in this or the preceding three paragraphs with respect to device 800, wherein the robot may be configured to operate within an operational design domain, wherein processor 810 may be further configured to determine, based on the sensor data, an operation status indicating whether the robot is operating within the operational design domain. Furthermore, in addition to or in combination with any of the features described in this or the preceding three paragraphs, processor 810 may be further configured to request, based on the operational status, an operational feedback with respect to the operational status. Furthermore, in addition to or in combination with any of the features described in this or the preceding three paragraphs, processor 810 may be further configured to update the operational design domain to an updated operational design domain that is based on the operational feedback. Furthermore, in addition to or in combination with any of the features described in this or the preceding three paragraphs, processor 810 configured to update the object detection model to the updated object detection model based on the informational feedback may include that processor 810 may be configured to train the object detection model with a label for the object based on the informational feedback.

Furthermore, in addition to or in combination with any of the features described in this or the preceding four paragraphs with respect to device 800, processor 810 may be configured to receive the informational feedback from another robot with information about the field of view and/or object. Furthermore, in addition to or in combination with any of the features described in this or the preceding four paragraphs, processor 810 may be configured to receive the informational feedback from a human with information about the field of view and/or object. Furthermore, in addition to or in combination with any of the features described in this or the preceding four paragraphs, the sensor data may include image data of the field of view (e.g., from a sensor 820), processor 810 may be further configured to superimpose the accuracy metric and an identification label of the object into the image data to generate an augmented image data. Furthermore, in addition to or in combination with any of the features described in this or the preceding four paragraphs, processor 810 may be further configured to transmit the augmented image data to an external display device (e.g., an AR-HoloLens). Furthermore, in addition to or in combination with any of the features described in this or the preceding four paragraphs, the updated object detection model may include an improved accuracy metric for the identification of the object as compared to the accuracy metric of the object detection model for the identification of the object.

Alternatively, device 800 may be a robot that includes a sensor 820 configured to capture sensor data within a field of view of the robot. Device 800 also includes processor 810 configured to, based on the sensor data, identify a detected object within the field of view and determine an accuracy metric (e.g., a confidence level) associated with the identification of the detected object using an object detection model associated with the identification of the detected object. Device 800 also includes an audio (e.g., NLP) interface communicatively coupled with the object detection model, the audio interface configured to request a verbal feedback regarding the identification of the detected object. Processor 810 is also configured to update the object detection model to an updated object detection model based on the verbal feedback.

Furthermore, in addition to or in combination with any of the features described in this or the preceding paragraph, device 800 may further include a control system configured to control movements of the robot based on the updated object detection model. Furthermore, in addition to or in combination with any of the features described in this or the preceding paragraph, the audio interface includes a microphone for receiving the verbal feedback. Furthermore, in addition to or in combination with any of the features described in this or the preceding paragraph, the audio interface includes a speaker configured to audibly provide a request for the verbal feedback. Furthermore, in addition to or in combination with any of the features described in this or the preceding paragraph, the identification of the detected object includes a recognition of an activity or a gesture within the field of view. Furthermore, in addition to or in combination with any of the features described in this or the preceding paragraph.

Alternatively, device 800 includes a processor 810 configured to receive sensor data (e.g., from sensor 820) representative of a field of view of a robot. Processor 810 is also configured to determine, based on the sensor data and an object detection model, an identification of a detected object within the field of view of the robot and an accuracy metric of the identification of the detected object, wherein the object detection model relates the sensor data to the identification. Device 800 also includes an audio (e.g., NLP) interface configured to receive a verbal query (e.g., from a human or other robot in the area) regarding the detected object and/or the field of view of the robot, wherein the audio interface is configured to acoustically convey an audio output in response to the verbal query.

Furthermore, in addition to or in combination with any of the features described in this or the preceding paragraph with respect to device 800, the audio interface may include a microphone for receiving the verbal query and a speaker configured to acoustically convey the audio output. Furthermore, in addition to or in combination with any of the features described in this or the preceding paragraph, the audio interface may include a speaker configured to audibly convey the audio output. Furthermore, in addition to or in combination with any of the features described in this or the preceding paragraph, the audio interface may include a speech recognition model and a natural language processing model. Furthermore, in addition to or in combination with any of the features described in this or the preceding paragraph, the detected object may include an individual object in a list of detected objects within the field of view and a corresponding accuracy metric for the individual object, wherein the verbal query includes a request to convey the list of detected objects, wherein the audio output includes the list of detected objects and corresponding accuracy metrics.

Furthermore, in addition to or in combination with any of the features described in this or the preceding two paragraphs with respect to device 800, the detected object may include an identified object that has been illuminated with a laser point of light to identify the detected object as a subject of the verbal query. Furthermore, in addition to or in combination with any of the features described in this or the preceding two paragraphs, the audio output may include a location of the detected object within the field of view. Furthermore, in addition to or in combination with any of the features described in this or the preceding two paragraphs, the audio output may include a timestamp of when the detected object was detected within the field of view. Furthermore, in addition to or in combination with any of the features described in this or the preceding two paragraphs, the verbal query may include a request to convey a list of objects detected during a timeframe.

Furthermore, in addition to or in combination with any of the features described in this or the preceding three paragraphs with respect to device 800, the audio output may include a list of objects within the field of view, wherein the detected object includes one detected object in the list of objects. Furthermore, in addition to or in combination with any of the features described in this or the preceding three paragraphs, processor 810 may be configured to associate a label with the verbal query, wherein the label may identify a class of detected object or an operational domain in which the robot is operating. Furthermore, in addition to or in combination with any of the features described in this or the preceding three paragraphs, processor 810 may be configured to determine an allowable action (e.g., ignore, can be pushed, should be avoided, etc.) associated with the label.

Figure 9:
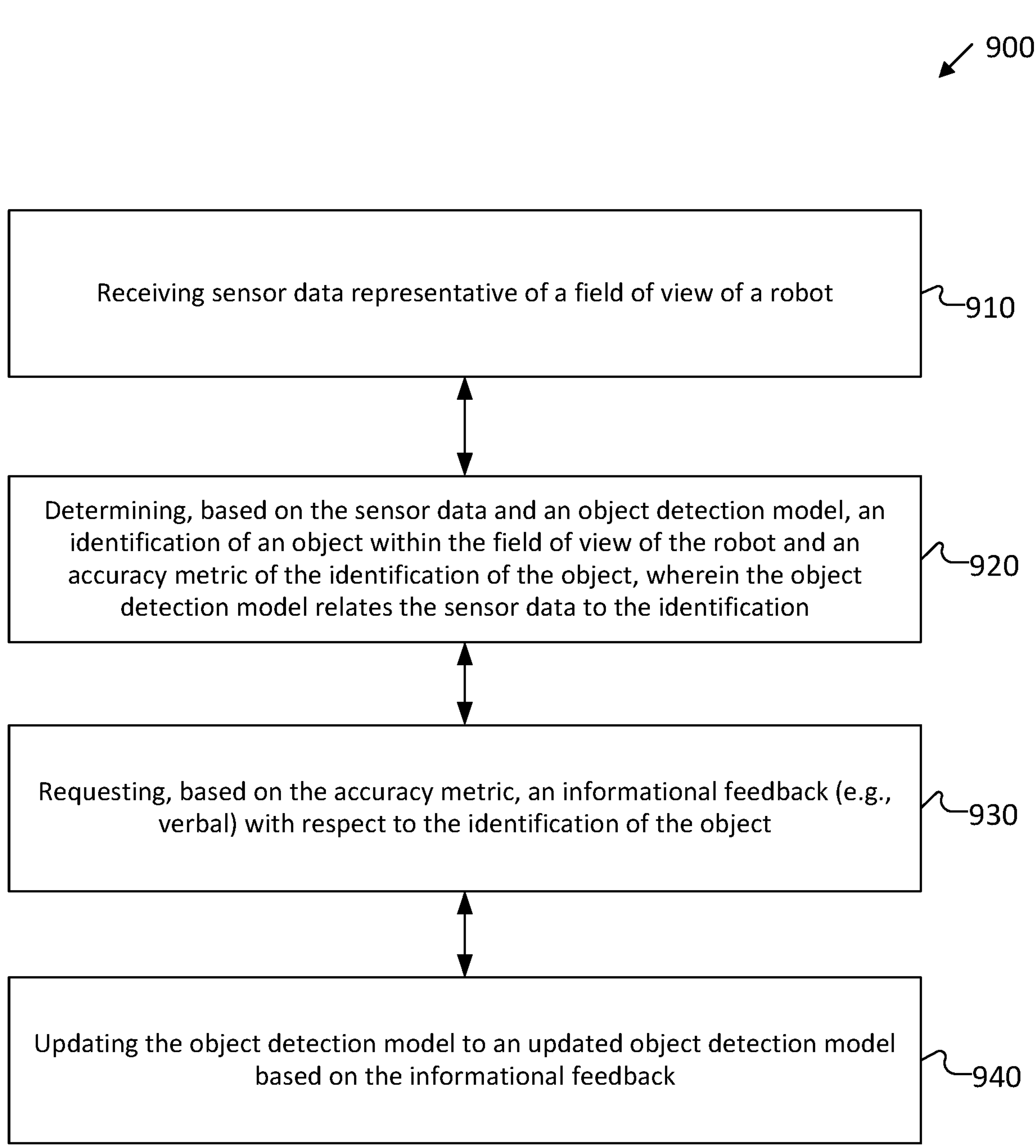
FIG. 9 depicts an exemplary schematic flow diagram of a method of interaction between a sensing system and a nearby human/robot.

FIG. 9 depicts a schematic flow diagram of a method 900 for a sensing system to gain feedback from nearby humans/robots. Method 900 may implement any of the features discussed above with respect to the sensing system discussed above and/or FIGS. 1-8. Method 900 includes, in 910, receiving sensor data representative of a field of view of a robot. Method 900 also includes, in 920, determining, based on the sensor data and an object detection model, an identification of an object within the field of view of the robot and an accuracy metric of the identification of the object, wherein the object detection model relates the sensor data to the identification. Method 900 also includes, in 930, requesting, based on the accuracy metric, an informational feedback (e.g., verbal) from the identification of the object. Method 900 also includes, in 940, updating the object detection model to an updated object detection model based on the informational feedback.

In the following, various examples are provided that may include one or more aspects described with reference to the sensing systems discussed above and/or any of FIGS. 1-9. The examples provided in relation to the devices may apply also to the described method(s), and vice versa.

Example 1 is a device including a processor configured to receive sensor data representative of a field of view of a robot. The processor is also configured to determine, based on the sensor data and an object detection model, an identification of an object within the field of view of the robot and an accuracy metric of the identification of the object, wherein the object detection model relates the sensor data to the identification. The processor is also configured to request, based on the accuracy metric, an informational feedback (e.g., verbal) from the identification of the object. The processor is also configured to update the object detection model to an updated object detection model based on the informational feedback.

Example 2 is the device of example 1, wherein the processor is further configured to control movements of the robot based on the updated object detection model.

Example 3 is the device of any one of examples 1 to 2, wherein the processor is further configured to request the informational feedback based on whether the accuracy metric satisfies a predefined criterion.

Example 4 is the device of example 3, wherein the predefined criterion includes whether the accuracy metric is below a threshold value of accuracy.

Example 5 is the device of any one of examples 1 to 4, wherein the informational feedback includes a verbal feedback (e.g., from a human via an audio interface) and/or an electronic message (e.g., from a second robot).

Example 6 is the device of any one of examples 1 to 5, wherein the accuracy metric includes a confidence metric indicating an extent to which the identification of the object substantially correct.

Example 7 is the device of any one of examples 1 to 6, wherein the processor is further configured to maintain (e.g., in a memory) a representation of an operational environment of the robot (e.g., an occupancy grid), wherein the representation includes detected objects in the operational environment, wherein one detected object of the detected objects includes the object, wherein the processor is further configured to request, based on the accuracy metric, the informational feedback about the detected object. The processor is further configured to update the representation of the operational environment to an updated representation based on the informational feedback about the detected object.

Example 8 is the device of example 7, wherein the processor is further configured to transmit the updated object detection model (e.g., wirelessly, e.g., via a transceiver) to an external server and/or another robot.

Example 9 is the device of any one of examples 7 to 8, wherein the processor is further configured to cause to transmit (e.g., via a transceiver) the updated representation to an external server and/or another robot.

Example 10 is the device of any one of examples 1 to 9, wherein the robot is configured to operate within an operational design domain, wherein the processor is further configured to determine, based on the sensor data, an operation status indicating whether the robot is operating within the operational design domain. The processor is further configured to request, based on the operational status, an operational feedback with respect to the operational status. The processor is further configured to update the operational design domain to an updated operational design domain that is based on the operational feedback.

Example 11 is the device of any one of example 10, wherein the processor configured to update the object detection model to the updated object detection model based on the informational feedback includes the processor configured to train the object detection model with a label for the object based on the informational feedback.

Example 12 is the device of any one of examples 1 to 11, wherein the processor is configured to receive the informational feedback from a second robot with information about the field of view and/or object.

Example 13 is the device of any one of examples 1 to 12, wherein the processor is configured to receive the informational feedback from a human with information about the field of view and/or object.

Example 14 is the device of any one of examples 1 to 13, wherein the sensor data includes image data of the field of view, wherein the processor is further configured to superimpose the accuracy metric and an identification label of the object into the image data to generate an augmented image data.

Example 15 is the device of example 14, wherein the device is further configured to transmit the augmented image data to an external display device (e.g., an AR-HoloLens).

Example 16 is the device of any one of examples 1 to 15, wherein the updated object detection model includes an improved accuracy metric for the identification of the object as compared to the accuracy metric of the object detection model for the identification of the object.

Example 17 is a robot including a sensor configured to capture sensor data within a field of view of the robot. The robot also includes a processor to identify a detected object within the field of view and determine an accuracy metric (e.g., a confidence level) associated with the identification of the detected object using an object detection model associated with the identification of the detected object. The robot also includes an audio (e.g., NLP) interface communicatively coupled with the processor, the audio interface configured to request a verbal feedback regarding the identification of the detected object. The processor is also configured to update the object detection model to an updated object detection model based on the verbal feedback.

Example 18 is the robot of example 17, the robot further including a control system configured to control movements of the robot based on the updated object detection model.

Example 19 is the robot of any one of examples 17 to 18, wherein the audio interface includes a microphone for receiving the verbal feedback.

Example 20 is the robot of any one of examples 17 to 19, wherein the audio interface includes a speaker configured to audibly provide a request for the verbal feedback.

Example 21 is the robot of any one of examples 17 to 20, wherein the identification of the detected object includes a recognition of an activity or a gesture within the field of view.

Example 22 is a device including a processor configured to receive sensor data representative of a field of view of a robot. The processor is also configured to determine, based on the sensor data and an object detection model, an identification of a detected object within the field of view of the robot and an accuracy metric of the identification of the detected object, wherein the object detection model relates the sensor data to the identification. The device also includes an audio (e.g., NLP) interface configured to receive a verbal query (e.g., from a human or other robot in the area) regarding the detected object and/or the field of view of the robot, wherein the audio interface is configured to acoustically convey an audio output in response to the verbal query.

Example 23 is the device of example 22, wherein the audio interface includes a microphone for receiving the verbal query and a speaker configured to acoustically convey the audio output.

Example 24 is the device of any one of examples 22 to 23, wherein the audio interface includes a speaker configured to audibly convey the audio output.

Example 25 is the device of any one of examples 22 to 24, wherein the audio interface includes a speech recognition model and a natural language processing model.

Example 26 is the device of any one of examples 22 to 25, wherein the detected object includes an individual object in a list of detected objects within the field of view and a corresponding accuracy metric for the individual object, wherein the verbal query includes a request to convey the list of detected objects, wherein the audio output includes the list of detected objects and corresponding accuracy metrics.

Example 27 is the device of any one of examples 22 to 26, wherein the detected object includes an identified object that has been illuminated with a laser point of light to identify the detected object as a subject of the verbal query.

Example 28 is the device of any one of examples 22 to 27, wherein the audio output includes a location of the detected object within the field of view.

Example 29 is the device of any one of examples 22 to 28, wherein the audio output includes a timestamp of when the detected object was detected within the field of view.

Example 30 is the device of any one of examples 22 to 29, wherein the verbal query includes a request to convey a list of objects detected during a timeframe.

Example 31 is the device of any one of examples 22 to 30, wherein the audio output includes a list of objects within the field of view, wherein the detected object includes one detected object in the list of objects.

Example 32 is the device of any one of examples 22 to 31, wherein the processor is configured to associate a label with the verbal query, wherein the label identifies a class of detected object or an operational domain in which the robot is operating.

Example 33 is the device of any one of examples 22 to 32, wherein the processor is configured to determine an allowable action (e.g., ignore, can be pushed, should be avoided, etc.) associated with the label.

Example 34 is a method including receiving sensor data representative of a field of view of a robot. The method also includes determining, based on the sensor data and an object detection model, an identification of an object within the field of view of the robot and an accuracy metric of the identification of the object, wherein the object detection model relates the sensor data to the identification. The method also includes requesting, based on the accuracy metric, an informational feedback (e.g., verbal) from the identification of the object. The method also includes updating the object detection model to an updated object detection model based on the informational feedback.

Example 35 is the method of example 34, the method further including controlling movements of the robot based on the updated object detection model.

Example 36 is the method of any one of examples 34 to 35, the method further including requesting the informational feedback based on whether the accuracy metric satisfies a predefined criterion.

Example 37 is the method of example 36, wherein the predefined criterion includes whether the accuracy metric is below a threshold value of accuracy.

Example 38 is the method of any one of examples 34 to 37, wherein the informational feedback includes a verbal feedback (e.g., from a human via an audio interface) and/or an electronic message (e.g., from a second robot).

Example 39 is the method of any one of examples 34 to 38, wherein the accuracy metric includes a confidence metric indicating an extent to which the identification of the object substantially correct.

Example 40 is the method of any one of examples 34 to 39, the method further including maintaining (e.g., storing in a memory) a representation of an operational environment of the robot (e.g., an occupancy grid), wherein the representation includes detected objects in the operational environment, wherein one detected object of the detected objects includes the object, wherein the method further includes requesting, based on the accuracy metric, the informational feedback about the detected object. The method further includes updating the representation of the operational environment to an updated representation based on the informational feedback about the detected object.

Example 41 is the method of example 40, the method further including transmitting the updated object detection model (e.g., wirelessly, e.g., via a transceiver) to an external server and/or another robot.

Example 42 is the method of any one of examples 40 to 41, the method further including causing to transmit (e.g., via a transceiver) the updated representation to an external server and/or another robot.

Example 43 is the method of any one of examples 34 to 42, wherein the robot is configured to operate within an operational design domain, wherein the method further includes determining, based on the sensor data, an operation status indicating whether the robot is operating within the operational design domain. The method further includes requesting, based on the operational status, an operational feedback with respect to the operational status. The method further includes updating the operational design domain to an updated operational design domain that is based on the operational feedback.

Example 44 is the method of any one of example 43, wherein the updating the object detection model to the updated object detection model based on the informational feedback includes training the object detection model with a label for the object based on the informational feedback.

Example 45 is the method of any one of examples 34 to 44, wherein the method further includes receiving the informational feedback from a second robot with information about the field of view and/or object.

Example 46 is the method of any one of examples 34 to 45, the method further includes receiving the informational feedback from a human with information about the field of view and/or object.

Example 47 is the method of any one of examples 34 to 46, wherein the sensor data includes image data of the field of view, wherein the method further includes superimposing the accuracy metric and an identification label of the object into the image data to generate an augmented image data.

Example 48 is the method of example 47, the method further including transmitting the augmented image data to an external display device (e.g., an AR-HoloLens).

Example 49 is the method of any one of examples 34 to 48, wherein the updated object detection model includes an improved accuracy metric for the identification of the object as compared to the accuracy metric of the object detection model for the identification of the object.

Example 50 is a method including capturing (e.g., via a sensor) sensor data within a field of view of a robot. The method also includes identifying (e.g., via an object detection model) based on the sensor data a detected object within the field of view and determining an accuracy metric (e.g., a confidence level) associated with the identifying of the detected object. The method also includes requesting (e.g., via an audio (e.g., NLP) interface communicatively coupled with the object detection model) a verbal feedback regarding the identifying of the detected object. The method also includes updating (e.g., via a processor running a training module) the object detection model to an updated object detection model based on the verbal feedback.

Example 51 is the method of example 50, the method further including controlling (via a control system) movements of the robot based on the updated object detection model.

Example 52 is the method of any one of examples 50 to 51, wherein the audio interface includes a microphone for receiving the verbal feedback.

Example 53 is the method of any one of examples 50 to 52, wherein the audio interface includes a speaker configured to audibly provide a request for the verbal feedback.

Example 54 is the method of any one of examples 50 to 53, wherein identifying the detected object includes recognizing an activity or a gesture within the field of view.

Example 55 is a method including receiving sensor data representative of a field of view of a robot. The method also includes determining, based on the sensor data and an object detection model, an identification of a detected object within the field of view of the robot and an accuracy metric of the identification of the detected object, wherein the object detection model relates the sensor data to the identification. The method also includes receiving (via an audio (e.g., NLP) interface) a verbal query (e.g., from a human or other robot in the area) regarding the detected object and/or the field of view of the robot, wherein the method further includes acoustically conveying (e.g., via the audio interface) an audio output in response to the verbal query.

Example 56 is the method of example 55, the method further including receiving (e.g., via a microphone of the audio interface) the verbal query and acoustically conveying the audio output (e.g., via a speaker).

Example 57 is the method of any one of examples 55 to 56, the method further including audibly conveying (e.g., via a speaker of the audio interface) the audio output.

Example 58 is the method of any one of examples 55 to 57, wherein the audio interface includes a speech recognition model and a natural language processing model.

Example 59 is the method of any one of examples 55 to 58, wherein the detected object includes an individual object in a list of detected objects within the field of view and a corresponding accuracy metric for the individual object, wherein the verbal query includes a request to convey the list of detected objects, wherein the audio output includes the list of detected objects and corresponding accuracy metrics.

Example 60 is the method of any one of examples 55 to 59, wherein the detected object includes an identified object that has been illuminated with a laser point of light to identify the detected object as a subject of the verbal query.

Example 61 is the method of any one of examples 55 to 60, wherein the audio output includes a location of the detected object within the field of view.

Example 62 is the method of any one of examples 55 to 61, wherein the audio output includes a timestamp of when the detected object was detected within the field of view.

Example 63 is the method of any one of examples 55 to 62, wherein the verbal query includes a request to convey a list of objects detected during a timeframe.

Example 64 is the method of any one of examples 55 to 63, wherein the audio output includes a list of objects within the field of view, wherein the detected object includes one detected object in the list of objects.

Example 65 is the method of any one of examples 55 to 64, the method further including associating a label with the verbal query, wherein the label identifies a class of detected object or an operational domain in which the robot is operating.

Example 66 is the method of any one of examples 55 to 65, the method further including determining an allowable action (e.g., ignore, can be pushed, should be avoided, etc.) associated with the label.

Example 67 is an apparatus including a means for receiving sensor data representative of a field of view of a robot. The apparatus also includes a means for determining, based on the sensor data and an object detection model, an identification of an object within the field of view of the robot and an accuracy metric of the identification of the object, wherein the object detection model relates the sensor data to the identification. The apparatus also includes a means for requesting, based on the accuracy metric, an informational feedback (e.g., verbal) from the identification of the object. The apparatus also includes a means for updating the object detection model to an updated object detection model based on the informational feedback.

Example 68 is the apparatus of example 67, the apparatus further including a means for controlling movements of the robot based on the updated object detection model.

Example 69 is the apparatus of any one of examples 67 to 68, the apparatus further including a means for requesting the informational feedback based on whether the accuracy metric satisfies a predefined criterion.

Example 70 is the apparatus of example 69, wherein the predefined criterion includes whether the accuracy metric is below a threshold value of accuracy.

Example 71 is the apparatus of any one of examples 67 to 70, wherein the informational feedback includes a verbal feedback (e.g., from a human via an audio interface) and/or an electronic message (e.g., from a second robot).

Example 72 is the apparatus of any one of examples 67 to 71, wherein the accuracy metric includes a confidence metric indicating an extent to which the identification of the object substantially correct.

Example 73 is the apparatus of any one of examples 67 to 72, the apparatus further including a means for maintaining (e.g., storing in a memory), wherein the representation includes detected objects in the operational environment, wherein one detected object of the detected objects includes the object, wherein the apparatus further include a means for requesting, based on the accuracy metric, the informational feedback about the detected object. The apparatus further includes a means for updating the representation of the operational environment to an updated representation based on the informational feedback about the detected object.

Example 74 is the apparatus of example 73, the apparatus further includes a means for transmitting the updated object detection model (e.g., wirelessly, e.g., via a transceiver) to an external server and/or another robot.

Example 75 is the apparatus of any one of examples 73 to 74, the apparatus further including a means for causing to transmit (e.g., via a transceiver) the updated representation to an external server and/or another robot.

Example 76 is the apparatus of any one of examples 67 to 75, wherein the robot is configured to operate within an operational design domain, wherein the apparatus further includes a means for determining, based on the sensor data, an operation status indicating whether the robot is operating within the operational design domain. The apparatus further includes a means for requesting, based on the operational status, an operational feedback with respect to the operational status. The apparatus further includes a means for updating the operational design domain to an updated operational design domain that is based on the operational feedback.

Example 77 is the apparatus of any one of example 76, wherein the a means for updating the object detection model to the updated object detection model based on the informational feedback includes a means for training the object detection model with a label for the object based on the informational feedback.

Example 78 is the apparatus of any one of examples 67 to 77, wherein the apparatus further includes a means for receiving the informational feedback from a second robot with information about the field of view and/or object.

Example 79 is the apparatus of any one of examples 67 to 78, the apparatus further includes a means for receiving the informational feedback from a human with information about the field of view and/or object.

Example 80 is the apparatus of any one of examples 67 to 79, wherein the sensor data includes image data of the field of view, wherein the apparatus further includes a means for superimposing the accuracy metric and an identification label of the object into the image data to generate an augmented image data.

Example 81 is the apparatus of example 80, the apparatus further including a means for transmitting the augmented image data to an external display device (e.g., an AR-HoloLens).

Example 82 is the apparatus of any one of examples 67 to 81, wherein the updated object detection model includes an improved accuracy metric for the identification of the object as compared to the accuracy metric of the object detection model for the identification of the object.

Example 83 is an apparatus including a means for capturing (e.g., via a sensor) sensor data within a field of view of a robot. The apparatus also includes a means for identifying (e.g., via an object detection model), based on the sensor data, a detected object within the field of view and a means for determining an accuracy metric (e.g., a confidence level) associated with the identifying of the detected object. The apparatus also includes a means for requesting (e.g., via an audio (e.g., NLP) interface communicatively coupled with the object detection model) a verbal feedback regarding the identifying of the detected object. The apparatus also includes a means for updating (e.g., via a means for running a training module) the object detection model to an updated object detection model based on the verbal feedback.

Example 84 is the apparatus of example 83, the apparatus further includes a means for controlling (via a control system) movements of the robot based on the updated object detection model.

Example 85 is the apparatus of any one of examples 83 to 84, wherein the audio interface includes a means for receiving the verbal feedback (e.g. a microphone).

Example 86 is the apparatus of any one of examples 83 to 85, wherein the audio interface includes a means for audibly providing a request for the verbal feedback (e.g., a speaker).

Example 87 is the apparatus of any one of examples 83 to 86, wherein the means for identifying the detected object includes a means for recognizing an activity or a gesture within the field of view.

Example 88 is an apparatus including receiving sensor data representative of a field of view of a robot. The apparatus also includes a means for determining, based on the sensor data and an object detection model, an identification of a detected object within the field of view of the robot and an accuracy metric of the identification of the detected object, wherein the object detection model relates the sensor data to the identification. The apparatus also includes a means for receiving (via an audio (e.g., NLP) interface) a verbal query (e.g., from a human or other robot in the area) regarding the detected object and/or the field of view of the robot, wherein the apparatus further includes a means for acoustically conveying (e.g., via the audio interface) an audio output in response to the verbal query.

Example 89 is the apparatus of example 88, the apparatus further including a means for receiving (e.g., via a microphone of the audio interface) the verbal query and a means for acoustically conveying the audio output (e.g., via a speaker).

Example 90 is the apparatus of any one of examples 88 to 89, the apparatus further includes a means for audibly conveying (e.g., via a speaker of the audio interface) the audio output.

Example 91 is the apparatus of any one of examples 88 to 90, wherein the audio interface includes a speech recognition model and a natural language processing model.

Example 92 is the apparatus of any one of examples 88 to 91, wherein the detected object includes an individual object in a list of detected objects within the field of view and a corresponding accuracy metric for the individual object, wherein the verbal query includes a request to convey the list of detected objects, wherein the audio output includes the list of detected objects and corresponding accuracy metrics.

Example 93 is the apparatus of any one of examples 88 to 92, wherein the detected object includes an identified object that has been illuminated with a laser point of light to identify the detected object as a subject of the verbal query.

Example 94 is the apparatus of any one of examples 88 to 93, wherein the audio output includes a location of the detected object within the field of view.

Example 95 is the apparatus of any one of examples 88 to 94, wherein the audio output includes a timestamp of when the detected object was detected within the field of view.

Example 96 is the apparatus of any one of examples 88 to 95, wherein the verbal query includes a request to convey a list of objects detected during a timeframe.

Example 97 is the apparatus of any one of examples 88 to 96, wherein the audio output includes a list of objects within the field of view, wherein the detected object includes one detected object in the list of objects.

Example 98 is the apparatus of any one of examples 88 to 97, the apparatus further including a means for associating a label with the verbal query, wherein the label identifies a class of detected object or an operational domain in which the robot is operating.

Example 99 is the apparatus of any one of examples 88 to 98, the apparatus further including a means for determining an allowable action (e.g., ignore, can be pushed, should be avoided, etc.) associated with the label.

Example 100 is a non-transitory, computer-readable medium including instructions, that, when executed, cause one or more processors to receive sensor data representative of a field of view of a robot. The instructions also cause the one or more processors to determine, based on the sensor data and an object detection model, an identification of an object within the field of view of the robot and an accuracy metric of the identification of the object, wherein the object detection model relates the sensor data to the identification. The instructions also cause the one or more processors to request, based on the accuracy metric, an informational feedback (e.g., verbal) from the identification of the object. The instructions also cause the one or more processors to update the object detection model to an updated object detection model based on the informational feedback.

Example 101 is the non-transitory, computer-readable medium of example 100, wherein the instructions also cause the one or more processors to control movements of the robot based on the updated object detection model.

Example 102 is the non-transitory, computer-readable medium of any one of examples 100 to 101, wherein the instructions also cause the one or more processors to request the informational feedback based on whether the accuracy metric satisfies a predefined criterion.

Example 103 is the non-transitory, computer-readable medium of example 102, wherein the predefined criterion includes whether the accuracy metric is below a threshold value of accuracy.

Example 104 is the non-transitory, computer-readable medium of any one of examples 100 to 103, wherein the informational feedback includes a verbal feedback (e.g., from a human via an audio interface) and/or an electronic message (e.g., from a second robot).

Example 105 is the non-transitory, computer-readable medium of any one of examples 100 to 104, wherein the accuracy metric includes a confidence metric indicating an extent to which the identification of the object substantially correct.

Example 106 is the non-transitory, computer-readable medium of any one of examples 100 to 105, wherein the instructions also cause the one or more processors to maintain (e.g., in a memory) a representation of an operational environment of the robot (e.g., an occupancy grid), wherein the representation includes detected objects in the operational environment, wherein one detected object of the detected objects includes the object, wherein the processor is further configured to request, based on the accuracy metric, the informational feedback about the detected object. The instructions also cause the one or more processors to update the representation of the operational environment to an updated representation based on the informational feedback about the detected object.

Example 107 is the non-transitory, computer-readable medium of example 106, wherein the instructions also cause the one or more processors to transmit the updated object detection model (e.g., wirelessly, e.g., via a transceiver) to an external server and/or another robot.

Example 108 is the non-transitory, computer-readable medium of any one of examples 106 to 107, wherein the instructions also cause the one or more processors to cause to transmit (e.g., via a transceiver) the updated representation to an external server and/or another robot.

Example 109 is the non-transitory, computer-readable medium of any one of examples 100 to 108, wherein the robot is configured to operate within an operational design domain, wherein the instructions also cause the one or more processors to determine, based on the sensor data, an operation status indicating whether the robot is operating within the operational design domain. The instructions also cause the one or more processors to request, based on the operational status, an operational feedback with respect to the operational status. The processor is further configured to update the operational design domain to an updated operational design domain that is based on the operational feedback.

Example 110 is the non-transitory, computer-readable medium of any one of example 109, wherein the instructions that cause the one or more processors to update the object detection model to the updated object detection model based on the informational feedback includes that the instructions also cause the one or more processors to train the object detection model with a label for the object based on the informational feedback.

Example 111 is the non-transitory, computer-readable medium of any one of examples 100 to 110, wherein the instructions also cause the one or more processors to receive the informational feedback from a second robot with information about the field of view and/or object.

Example 112 is the non-transitory, computer-readable medium of any one of examples 100 to 111, wherein the instructions also cause the one or more processors to receive the informational feedback from a human with information about the field of view and/or object.

Example 113 is the non-transitory, computer-readable medium of any one of examples 100 to 112, wherein the sensor data includes image data of the field of view, wherein the instructions also cause the one or more processors to superimpose the accuracy metric and an identification label of the object into the image data to generate an augmented image data.

Example 114 is the non-transitory, computer-readable medium of example 113, wherein the instructions further cause the one or more processors to transmit the augmented image data to an external display device (e.g., an AR-HoloLens).

Example 115 is the non-transitory, computer-readable medium of any one of examples 100 to 114, wherein the updated object detection model includes an improved accuracy metric for the identification of the object as compared to the accuracy metric of the object detection model for the identification of the object.

Example 116 is a non-transitory, computer-readable medium including a processor configured to receive sensor data representative of a field of view of a robot. The instructions also cause the one or more processors to determine, based on the sensor data and an object detection model, an identification of a detected object within the field of view of the robot and an accuracy metric of the identification of the detected object, wherein the object detection model relates the sensor data to the identification. The non-transitory, computer-readable medium is communicably connected with an audio (e.g., NLP) interface configured to receive a verbal query (e.g., from a human or other robot in the area) regarding the detected object and/or the field of view of the robot, wherein the audio interface is configured to acoustically convey an audio output in response to the verbal query.

Example 117 is the non-transitory, computer-readable medium of example 116, wherein the audio interface includes a microphone for receiving the verbal query and a speaker configured to acoustically convey the audio output.

Example 118 is the non-transitory, computer-readable medium of any one of examples 116 to 117, wherein the audio interface includes a speaker configured to audibly convey the audio output.

Example 119 is the non-transitory, computer-readable medium of any one of examples 116 to 118, wherein the audio interface includes a speech recognition model and a natural language processing model.

Example 120 is the non-transitory, computer-readable medium of any one of examples 116 to 119, wherein the detected object includes an individual object in a list of detected objects within the field of view and a corresponding accuracy metric for the individual object, wherein the verbal query includes a request to convey the list of detected objects, wherein the audio output includes the list of detected objects and corresponding accuracy metrics.

Example 121 is the non-transitory, computer-readable medium of any one of examples 116 to 120, wherein the detected object includes an identified object that has been illuminated with a laser point of light to identify the detected object as a subject of the verbal query.

Example 122 is the non-transitory, computer-readable medium of any one of examples 116 to 121, wherein the audio output includes a location of the detected object within the field of view.

Example 123 is the non-transitory, computer-readable medium of any one of examples 116 to 122, wherein the audio output includes a timestamp of when the detected object was detected within the field of view.

Example 124 is the non-transitory, computer-readable medium of any one of examples 116 to 123, wherein the verbal query includes a request to convey a list of objects detected during a timeframe.

Example 125 is the non-transitory, computer-readable medium of any one of examples 116 to 124, wherein the audio output includes a list of objects within the field of view, wherein the detected object includes one detected object in the list of objects.

Example 126 is the non-transitory, computer-readable medium of any one of examples 116 to 125, wherein the instructions also cause the one or more processors associate a label with the verbal query, wherein the label identifies a class of detected object or an operational domain in which the robot is operating.

Example 127 is the non-transitory, computer-readable medium of any one of examples 116 to 126, wherein the instructions also cause the one or more processors determine an allowable action (e.g., ignore, can be pushed, should be avoided, etc.) associated with the label.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:

receive sensor data representative of a field of view of a robot;

determine, based on the sensor data and an object detection model, an identification of an object within the field of view and an accuracy metric of the identification of the object, wherein the object detection model relates the sensor data to the identification, wherein the sensor data comprises image data comprising a series of frames within the field of view;

generate detection information associated with the identification of the object, wherein the detection information comprises: a frame number of a frame within the series of frames in which the object is detected; a location of the object within the frame; and the accuracy metric;

request, based on the accuracy metric, an informational feedback regarding the identification of the object, wherein the informational feedback comprises an identification label for the object;

generate, from the identification label for the object and the detection information, training information for training the object detection model based on the identification label and the detection information, wherein the training information comprises the identification label, the frame number, the location, and the accuracy metric; and train the object detection model based on the training information to obtain an updated object detection model.

2. The device of claim 1, wherein the processor is further configured to control movements of the robot based on the updated object detection model.

3. The device of claim 1, wherein the processor is further configured to request the informational feedback based on whether the accuracy metric satisfies a predefined criterion.

4. The device of claim 3, wherein the predefined criterion comprises whether the accuracy metric is below a threshold value of accuracy.

5. The device of claim 1, wherein the informational feedback comprises a verbal feedback or an electronic message received from a nearby human or from a second robot.

6. The device of claim 1, wherein the accuracy metric comprises a confidence metric indicating an extent to which the identification of the object substantially correct.

7. The device of claim 1, wherein the processor is further configured to:

maintain a representation of an operational environment of the robot, wherein the representation comprises detected objects in the operational environment, wherein the object comprises one of the detected objects, wherein the processor is further configured to request, based on the accuracy metric, the informational feedback about the one of the detected objects; and update the representation of the operational environment to an updated representation based on the informational feedback about the one of the detected objects.

8. The device of claim 1, wherein the robot is configured to operate within an operational design domain, wherein the processor is further configured to:

determine, based on the sensor data, an operation status indicating whether the robot is operating within the operational design domain;

request, based on the operational status, an operational feedback with respect to the operational status; and update the operational design domain to an updated operational design domain that is based on the operational feedback.

9. The device of claim 1, wherein the sensor data comprises image data of the field of view, wherein the processor is further configured to superimpose the accuracy metric and an identification label of the object into the image data to generate an augmented image data.

10. The device of claim 9, wherein the device is further configured to transmit the augmented image data to an external display device.

11. The device of claim 1, wherein the updated object detection model comprises a higher accuracy metric for the identification of the object as compared to the accuracy metric of the object detection model for the identification of the object.

12. A device comprising:

a sensor configured to capture sensor data within a field of view of a robot, wherein the sensor data comprises image data comprising a series of frames within the field of view;

a processor configured to:

perform an identification of a detected object within the field of view of the robot, wherein the identification is output from an object detection model based on the sensor data; and determine an accuracy metric associated with the identification that is output from the object detection model;

generate detection information associated with the identification of the detected object, wherein the detection information comprises: a frame number of a frame within the series of frames in which the detected object is detected; a location of the detected object within the frame; and the accuracy metric; and an audio interface communicatively coupled with the processor, the audio interface configured to request a verbal feedback regarding the identification of the detected object, wherein the processor is configured to update the object detection model into an updated object detection model based on the verbal feedback, wherein the processor configured to update the object detection model into the updated object detection model based on the verbal feedback comprises the processor further configured to:

generate, from the verbal feedback and the detection information, training information for training the object detection model based on the verbal feedback and the detection information, wherein the training information comprises the verbal feedback regarding the identification, the frame number, the location, and the accuracy metric; and train the object detection model based on the training information to obtain the updated object detection model.

13. The device of claim 12, the device further comprising a control system configured to control movements of the robot based on the updated object detection model.

14. The device of claim 12, wherein the audio interface comprises a microphone for receiving the verbal feedback and a speaker configured to audibly provide a request for the verbal feedback.

* * * * *